US007124368B1

(12) United States Patent  
Subramanian et al.

(10) Patent No.: US 7,124,368 B1  
(45) Date of Patent: Oct. 17, 2006

(54) SYSTEM AND METHOD FOR DISPLAYING USAGE INFORMATION IN A DATA NETWORK

(75) Inventors: Mahesh Subramanian, San Jose, CA (US); Prashant Sawant, Los Gatos, CA (US)

(73) Assignee: CIENA Corporation, Linthicum, MD (US)

( * ) Notice: Subject to any disclaimer, the term of this patent is extended or adjusted under 35 U.S.C. 154(b) by 513 days.

(21) Appl. No.: 10/005,507

(22) Filed: Nov. 7, 2001

(51) Int. Cl.  
*G06F 3/00* (2006.01)

(52) U.S. Cl. .................................................. 715/736

(58) Field of Classification Search ............... 715/734, 715/735, 736, 738, 760, 733  
See application file for complete search history.

(56) References Cited

U.S. PATENT DOCUMENTS

| 5,751,965 | A  | * | 5/1998  | Mayo et al.   | 709/224 |
| 6,031,528 | A  | * | 2/2000  | Langfahl, Jr. | 715/734 |
| 6,496,209 | B1 | * | 12/2002 | Horii         | 715/853 |
| 6,603,822 | B1 | * | 8/2003  | Brede et al.  | 375/340 |
| 6,636,239 | B1 | * | 10/2003 | Arquie et al. | 715/736 |
| 6,772,204 | B1 | * | 8/2004  | Hansen        | 709/220 |
| 6,900,822 | B1 | * | 5/2005  | Germain et al.| 715/736 |
| 2002/0024535 | A1 | * | 2/2002 | Ueno et al.  | 345/736 |

* cited by examiner

*Primary Examiner*—Kristine Kincaid  
*Assistant Examiner*—Thanh Vu  
(74) *Attorney, Agent, or Firm*—Dougherty Clements; Christopher L. Bernard; Tyler S. Brown

(57) ABSTRACT

A channel map display module, at least one user interface template and storage for holding information about band and channel assignments, subrate information, provisioned circuit and subrate circuits are used to create a unique channel map that presents the network provisioning information in graphical form that is easy to understand. The channel map display module is coupled to and polls the administrative complex of each node in the network to retrieve and gather the data about the network. The channel map display module combines the with the novel user interface for presentation to the user. The channel map user interface displays all the circuits formed on a sub-network, the band and channel assignments, whether a node perform regeneration, and if the circuit is coupled to multiplexers for other subrate circuit in a single display window. The present invention also includes methods such as a method for generating a channel map display, method for providing additional channel and circuit information, and various methods for updating the channel map display in response to extrinsic network events.

26 Claims, 17 Drawing Sheets

| Circuit T... | Circuit N. | Access | Service | Admin S... | Oper St... | A Node | A Side | A TIP | A Band | A Channel | A Port E... | Z Node | Z Side | Z TIP | Z Band | Z Channel | Z Port E. | Line Co. | Line Co. |
|---|---|---|---|---|---|---|---|---|---|---|---|---|---|---|---|---|---|---|---|
| Bulk Rate | BULK 0 | Protected OC48/S | | locked | enabled | node 301 | west | 7-1-W | 7 | 1 | Yes | node 302 | east | 1-1-E | 1 | 1 | Yes | 0 | N/A |
| | Protected | | | | | | | | | | | | | | | | | | |

OK  Report  Export...

FIG. 14

| Circuit T... | Circuit N. | Access | Service | Admin S... | Oper St... | A Node | A Side | A TIP | A Band | A Channel | A Port Exits | Z Node | Z Side | Z TIP | Z Band | Z Channel | Z Port E. | Line Co. | Line |
|---|---|---|---|---|---|---|---|---|---|---|---|---|---|---|---|---|---|---|---|
| Sub Rate | GbE Ckt1 | Protected Gbe | | locked | enabled | node 301 | west | GRDM-TR-3-3 | | 7 | 1 Yes | node 302 | east | GRDM-TR-2-3-P1 | | 1 | 1 Yes | 0 | No |
| Sub Rate | GbE Ckt2 | Protected Gbe | | locked | enabled | node 301 | west | GRDM-TR-3-3 | | 7 | 1 Yes | node 302 | east | GRDM-TR-2-3-P2 | | 1 | 1 Yes | 0 | No |

[ / OK ]  [ Report ]  [ Export... ]

FIG. 15

Subrate Circuits details dialog

Channel Map of Subnetwork

DATE 22 42 35 Mon Sep 24 2001 UTC

TOTAL 33

| WEST | node 301 | node 302 | node 303 | EAST |
|---|---|---|---|---|
| B7 C1 | W:addDrop E:stop | W:stop E:addDrop | W:lineContinue E:lineContinue | B1 C1 |
| B7 C2 | W:stop E:stop | W:stop E:stop | W:lineContinue E:lineContinue | B1 C2 |
| B7 C3 | W:stop E:stop | W:stop E:stop | W:lineContinue E:lineContinue | B1 C3 |
| B8 C1 | W:stop E:stop | W:stop E:stop | W:lineContinue E:lineCtoninue | B2 C1 |
| B8 C2 | W:stop E:stop | W:stop E:stop | W:lineContinue E:lineContinue | B2 C2 |
| B8 C3 | W:stop E:stop | W:stop E:stop | W:lineContinue E:lineContinue | B2 C3 |
| B9 C1 | W:stop E:stop | W:stop E:stop | W:lineContinue E:lineContinue | B3 C1 |
| B9 C2 | W:stop E:stop | W:stop E:stop | W:lineContinue E:lineContinue | B3 C2 |
| B9 C3 | W:stop E:stop | W:stop E:stop | W:lineContinue E:lineContinue | B3 C3 |
| B10 C1 | W:stop E:addDrop | W:stop E:stop | W:lineContinue E:lineContinue | B4 C1 |
| B10 C2 | W:stop E:stop | W:stop E:stop | W:lineContinue E:lineContinue | B4 C2 |
| B10 C3 | W:stop E:stop | W:stop E:stop | W:lineContinue E:lineContinue | B4 C3 |
| B11 C1 | W:stop E:stop | W:stop E:stop | W:lineContinue E:lineContinue | B5 C1 |
| B11 C2 | W:stop E:stop | W:stop E:stop | W:lineContinue E:lineContinue | B5 C2 |
| B11 C3 | W:stop E:stop | W:stop E:stop | W:lineContinue E:lineContinue | B5 C3 |
| B6 C1 | W:stop E:stop | W:stop E:stop | W:stop E:stop | B6 C1 |
| B6 C2 | W:stop E:stop | W:stop E:stop | W:stop E:stop | B6 C2 |
| B6 C3 | W:stop E:stop | W:stop E:stop | W:stop E:stop | B6 C3 |
| B1 C1 | W:stop E:stop | W:stop E:stop | W:lineContinue E:lineContinue | B7 C1 |
| B1 C2 | W:stop E:stop | W:stop E:stop | W:lineContinue E:lineContinue | B7 C2 |
| B1 C3 | W:stop E:stop | W:stop E:stop | W:lineContinue E:lineContinue | B7 C3 |

FIG. 16

SYSTEM AND METHOD FOR DISPLAYING USAGE INFORMATION IN A DATA NETWORK

FIELD OF THE INVENTION

The present invention relates generally to communication systems and more particularly, to a system and method for providing administrative information about communications networks. Still more particularly, the present invention relates to novel graphical user interface that provides a channel map of the provisioning of an optical network.

BACKGROUND OF THE INVENTION

Nodes in a communications network such as an optical network may typically be associated with an administrative complex. The administrative complex includes an administrative node processor module (ANPM) having a processor and a primary database. The administrative complex is concerned with control of administrative functions, examples of which include configuring and monitoring elements of a node and providing a management interface to a user. The administrative functions also include creating paths within a network by provisioning channels or connections between network nodes. A key part of monitoring the network includes the ability to determine the existing band and channel allocations in a network and the status of such bands and channels.

A network may comprise many nodes, and each of the nodes may have an associated administrative complex. Each of the administrative complexes is communicatively coupled to a network management application that is used by personnel at a network operations center (NOC) who are responsible for monitoring and managing the entire network. Typically, information such as the status of a particular channel, the nodes that a channel couples (or circuits that have been provisioned), operations that are performed at a node, alarm states, administrative states of circuits, as well as other detailed information about the network is provided by the administrative complexes to the NOC. Users at the NOC typically formulate requests for information, send those requests to the administrative complexes, and receive responses from the administrative complexes on an as needed basis. In a similar manner, such information can be gathered as the network is configured, periodically once the network is operational, and at times when there are failures in the network.

However, one significant problem is that there are number of different types of information that must be gathered and understood by the network administrator. The administrative complexes provide this information in a piecemeal basis that makes it very difficult to get the correct information to configure the network. Moreover, it causes the NOC to issue repeated requests for the same information. Thus, there is a need for a method to provide information necessary for administration of the network in a more readable and useful manner.

While there have been attempts in the prior art to collect and present such information, such prior art attempts to provide a unified interface have a number of shortcomings. First, the channel allocation information was only available for a single node. Second, the information was limited to channel usage, and has not provided additional administrative information necessary for configuration of the network. Third, information about node pass through information was not available in prior art interfaces.

Therefore, in a network, it would be desirable if there was an interface that provides a channel map for a given sub-network, and also provides information necessary for configuring the network such as pass through information, circuit and subrate circuit information, and additional administrative information in an easily accessible manner. It would also be desirable if the channel map were updated on a real-time basis.

SUMMARY OF THE INVENTION

The present invention overcomes the limitations of the prior art with a system and method for displaying usage information about a network as a channel map. The system preferably includes a channel map display module, at least one user interface template and storage for holding information about band and channel assignments, subrate information, provisioned circuit and subrate circuits. In response to input from the user, the channel map display module generates and displays a channel map that presents the data in graphical form that is easy to understand. The channel map display module is coupled to and polls the administrative complex of each node in the network to retrieve and gather the data regarding band and channel assignments, subrate information, provisioned circuit and subrate circuits. The channel map display module then stores the information in its storage. In response to a user request, the channel map display module retrieves the stored data and combines it with the novel user interface for presentation to the user. The channel map user interface of the present invention displays all the circuits formed on a sub-network without having to look at each node element separately. The channel map user interface also displays the band and channel assignment, whether a node performs regeneration, and if the circuit is coupled to multiplexers for other subrate circuits in a single display window. This channel map user interface is particularly advantageous because it provides information necessary to provision and manage the network in a single location that was heretofore not possible.

The present invention also includes methods such as a method for generating a channel map display, method for providing additional channel and circuit information, and various methods for updating the channel map display in response to extrinsic network events.

BRIEF DESCRIPTION OF THE DRAWINGS

FIG. 14 illustrates a graphical representation of a user interface for showing circuit details.

FIG. 15 illustrates a graphical representation of a user interface for showing subrate circuit details.

FIG. 16 illustrates a graphical representation of a channel map HTML report generated by the system of the present invention.

DETAILED DESCRIPTION

A. Overview

Figure 1:
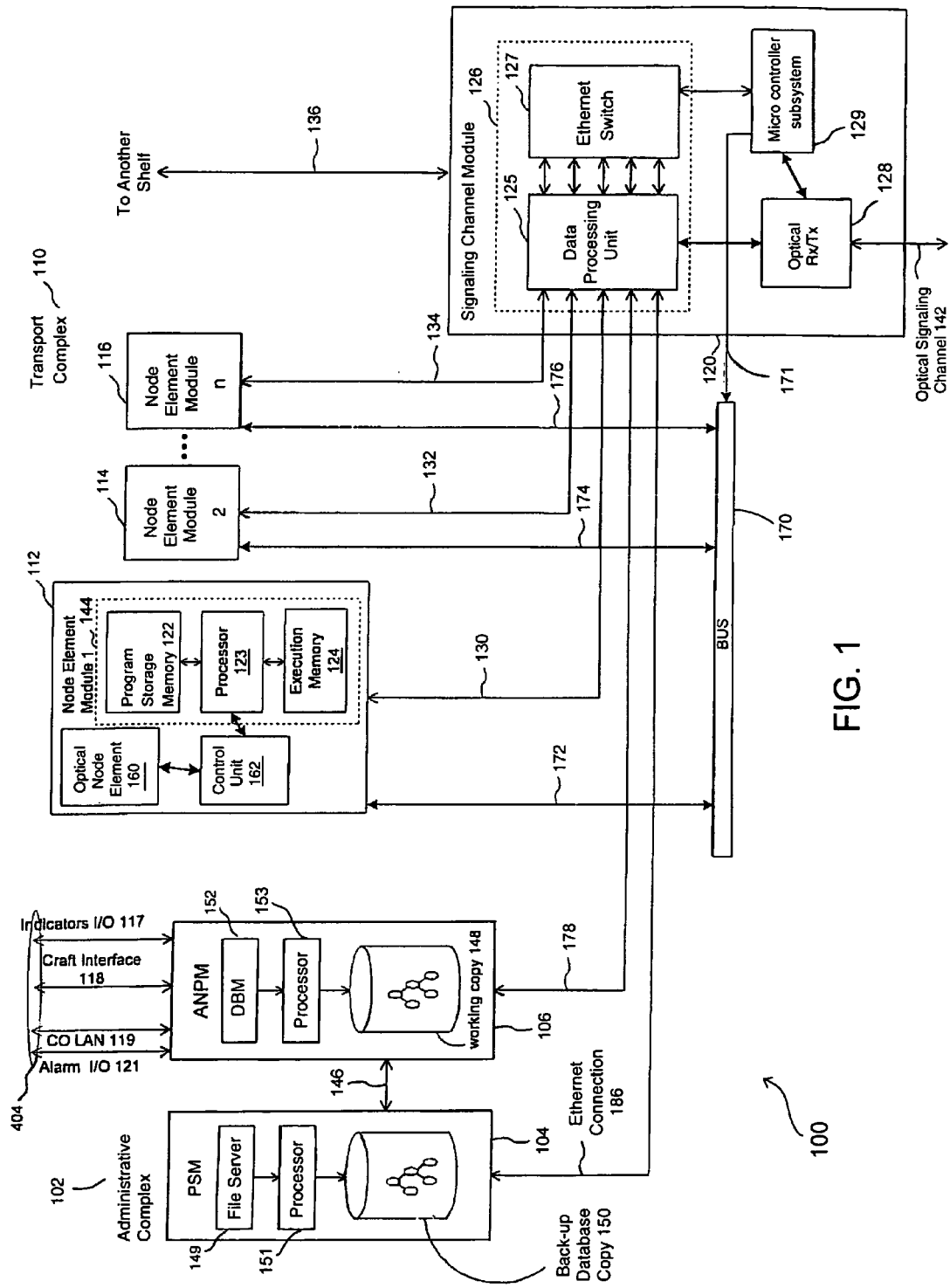
FIG. 1 illustrates an embodiment of a node in an optical communications network comprising an administrative complex and a transport complex.

Optical networks include nodes that process one or more optical wavelengths. An example of an optical network is a wavelength division multiplexed (WDM) optical network in which a plurality of wavelength channels are carried along an optical transmission medium. Each wavelength channel may carry other channels, each embodied as one or more time divisions of a time division multiplexed signal or one or more frequency divisions of a frequency division multiplexed signal. An example of an optical transmission medium is an optical fiber. Those of skill in the art will appreciate that the invention may be embodied in various network topologies, examples of which are ring and mesh topologies. Examples of activities which processing at a node may comprise include routing and add/drop multiplexing. A node may process one or more wavelengths in the optical domain. For example, a node may comprise optical elements, such as optical filters, that pass through wavelengths that are not added or dropped at the node. A node may also perform optical-to-electrical and electrical-to-optical conversions as part of the processing of wavelengths. For example, when dropping a wavelength from the network to a tributary node, an optical-to-electrical conversion may be necessary because electrical equipment is only on the other side or is part of wavelength conversion to a wavelength that can be processed only by the tributary node.

A method and apparatus for generating visual representations of channel allocation and mapping in an optical network is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an optical network. Such an optical network as claimed may be the entire network as detailed below in the preferred embodiment or only portions of such a network. For example, the present invention can operate with only the administrative complex of a node. Thus, the present invention is capable of operating with various portions of the network or node with minimal functionality similar to that functionality disclosed herein.

B. Anode

FIG. 1 shows an embodiment of a node 100 in an optical communication network. FIG. 1 illustrates an embodiment of a node 100 as a data and telecommunications transport platform. In this particular embodiment, the node 100 comprises an administrative complex 102, a transport complex 110 and a signaling channel module 120.

The transport complex 110 includes node element modules 112, 114, 116. The transport complex 110 is the collection of node elements 160 that carries the optical communications traffic. In other words, these are the modules 112, 114, 116 that process the "payload" data. For a transport complex 110 in a node 100 providing optical processing, the node elements 160 may comprise optical filters, switches, amplifiers, and attenuators. The transport complex 110 may also comprise one or more receivers or transmitters for access to the communication system for tributary signals.

Node element module 112 includes one or more optical node elements 160 and a control unit 162 including electrical hardware and software for controlling one or more of the node elements 160. In this embodiment, the node element modules 112 114, 116 share a common electronics architecture. This architecture comprises a microcontroller subsystem 144, including a processor 123, program storage memory 122, execution memory 124, an Ethernet connection 130, and a communication link 172 to an intra-nodal bus 170. In one embodiment, the intra-nodal bus 170 is a High-level Data Link Control (HDLC) bus. The microcontroller subsystem 144 may be augmented with additional I/O and control capabilities, as appropriate. A node element module 112 114, 116 may be embodied as a circuit pack.

In many systems today, node elements 160 are located on circuit packs, a certain number of which exist in a shelf unit. There may be one or more shelf units that comprise the hardware of the node. The number and arrangement of circuit packs in a shelf unit require planning to provide for, among other things, all necessary connections, heat dissipation, and power consumption. The circuit packs may be communicatively coupled to one another through a back plane.

The administrative complex 102 is primarily concerned with management of the node 100 and system related management functions. The administrative complex 102 typically has no payload traffic-affecting elements. The administrative complex 102 performs administrative node functions. Examples of administrative node functions are node configuration, provisioning, providing a management interface to the customer, retrieving and indicating failure conditions through alarms. In other words, the administrative complex 102 performs functions related to the operation, administration, maintenance, and provisioning (OAM&P) of the node 100. Another administrative function is interaction with external customer management systems to transmit the system's status and accept configuration commands. Other functions include reading external event inputs and signaling exception conditions on alarm outputs.

For example, the administrative complex 102 is responsible for storing the configuration information for the node element modules 112, 114, 116. Every node element module 112, 114, 116 at its initialization may upload its current configuration from the administrative complex 102. Examples of administrative information provided by the node element modules 112, 114, 116 to the administrative complex 102 are events such as state-changes. The administrative complex 102 accepts these events, and updates its own configuration.

The administrative complex 102 shown comprises two units: an administrative node processor module 106 having a working copy database 148 of administrative information for the node 100 and a persistent storage module 104 comprising a back-up copy 150 of the database stored in non-volatile memory.

A communication link 146 exists between the administrative node processor module 106 and the persistent storage module 104 for transfers of data. In this embodiment, the databases 148, 150 are object-oriented databases. The state of the node 100 may be represented as a run-time container of managed object instances. Changes to node operation are a result of the manipulation of the attributes of the managed objects. The working copy 148 of the administrative node processor module 106 is used during normal operations, and the backup copy 150 is maintained on the persistent storage module 104. The backup copy 150 is synchronized with the working copy 148 at all times and accessed in case the primary run-time database becomes corrupted or is deleted. For example if the administrative node processor module 106 is replaced, the backup database 150 on the persistent storage module 104 is copied onto the new administrative node processor module 106 when it is installed.

In the embodiment of FIG. 1, both the administrative node processor module 106 and the persistent storage module 104 comprise a processor, 151, 153, execution memory (not shown), for example, dynamic random access memory (DRAM) memory, program storage memory from which an operating system, for example Embedded NT, is downloaded. The processor 153 of the administrative node processor module 106 accesses the working copy 148 of the database and interacts with the persistent storage module 104 through the instructions of a database manager application 152 stored in program memory. The persistent storage module processor 151 executes a memory access application 149, such as a file server, to control access to the back-up database 150.

The example of the administrative node processor module 106 shown has additional features. For example, it has an input/output interface 119, for example an Ethernet interface, for communication to a central office local area network (CO LAN), and a Craft Interface 118 such as a serial interface for a Craft RS-232C, or a Modem RS-232C. The administrative node processor module 106 also comprises an alarm input/output external interface 121 and another input/output interface 117 for other indicators to be sent to a craft interface terminal (CIT) or a element management system (EMS).

The processor module 106 also has an intra-nodal communication link 178, in this example an Ethernet connection, to the signaling channel module 120. The persistent storage module 104 also has an intra-nodal communication link 186, in this example an Ethernet connection, to the signaling channel module 120.

The signaling channel module 120 also comprises the central connection point for intra-node communication between node element modules 112, 114, 116, the administrative node processor module 106 and the persistent storage module 104. Additionally, the signaling channel module 120 controls the transfer of information, including administrative information at this node 100, between the illustrated node 100 and other nodes of the network over an optical signaling channel.

An optical signaling channel may be embodied in several different ways. For example, the channel may be embodied as one or more dedicated wavelengths carrying administrative information wherein the one or more dedicated wavelength is out-of-band, or separate from the payload wavelengths. The signaling channel may be embodied in one or more divisions of a time-division multiplexed signal. In another embodiment, the signaling channel is carried in-band and is modulated onto the payload signals.

In the embodiment shown, the signaling channel module 120 comprises a Data Interconnection Unit 126 comprising in this example, an Ethernet Switch 127 and a Data Processing Unit 125, an optical transceiver unit 128 comprising an optical transmitter, an optical receiver and related control logic, and a microcontroller subsystem 129. In this embodiment, the microcontroller subsystem 129 has the same architecture as the microcontroller subsystem 144 for a node element module 112. The microcontroller subsystem 129 also has a communication link 171 to the intra-nodal bus 170.

For incoming communications from other nodes, the optical receiver unit 128 converts the optical signaling channel into electrical form. The electrical signal is sent to the Data Interconnection Unit 126. The signal is then pre-processed by the data processing unit 125. For example, if the data carried on the optical signaling channel uses asynchronous transfer mode (ATM) packet format as its data transmission protocol, the data processing unit 125 comprises ATM physical circuitry to convert the data stream to Ethernet packets to allow transport by the Ethernet switch 127 to the appropriate node element module based on packet header information. Other data formats or transmission protocols may also be used.

Outgoing data to other nodes is formatted by the data processing unit 125 and routed through the Ethernet Switch 127 to the optical transceiver unit 128 where the data is modulated by a transmitter (e.g. a laser) onto the optical signaling channel.

In the embodiment of FIG. 1, different node element modules 112, 114, 116 communicate over an Ethernet network across a back plane. The Ethernet network forms the basis of the communication system for intra-nodal communication. In this embodiment, the central point for intra-nodal communication and an interface between communications with other nodes and the intra-nodal communication system is implemented as the Data Interconnection Unit 126 comprising in this example, the Ethernet Switch 127 and the Data Processing Unit 125

This connection point is implemented as an Ethernet switch, which allows full duplex communications to be routed from one switch port to another. Full-duplex operation allows each port on the switch to simultaneously transmit and receive packets, and the Ethernet switch architecture provides sufficient internal bandwidth to allow independent port-to-port communication to occur simultaneously.

The optical signaling channel travels a path including one or more optical transmission media between the nodes. The optical signaling channel may be embodied in several different ways. In one embodiment, the optical signaling channel is embodied as one or more dedicated wavelengths carrying administrative information wherein the one or more dedicated wavelengths travel on optical fiber coupling the nodes of the network. Each dedicated wavelength is de-multiplexed (not shown) and received by the optical receiver of the signaling channel module 120. In one example, the signaling channel is a wavelength channel outside of the band of wavelengths on which payload data communications are carried. For example in an optical dense wavelength division multiplexing (DWDM) system in which the payload communications are carried in wavelengths in a typical pass-band of approximately 1530 nm and 1560 nm, the optical signaling channel may be carried on a wavelength of 1510 nm. A wavelength of either 1310 nm or 1480 nm may also be used. In another example, the optical signaling channel may be a dedicated wavelength within the pass-band of the payload wavelengths.

In another embodiment, lower frequencies, for example microwave frequencies, can be superimposed on the optical payload wavelengths by sub-carrier multiplexing (SCM) techniques. The signaling channel may also be embodied in one or more divisions of a time-division multiplexed signal. For example, a bit-stream header may be added to the payload data when the payload data is generated for transmission. At a receiver that performs optical to electrical conversion of the payload data wavelength, the header is removed and its information is forwarded for processing to the signaling channel module.

C. A Network or Sub-Network of Nodes

Figure 2:
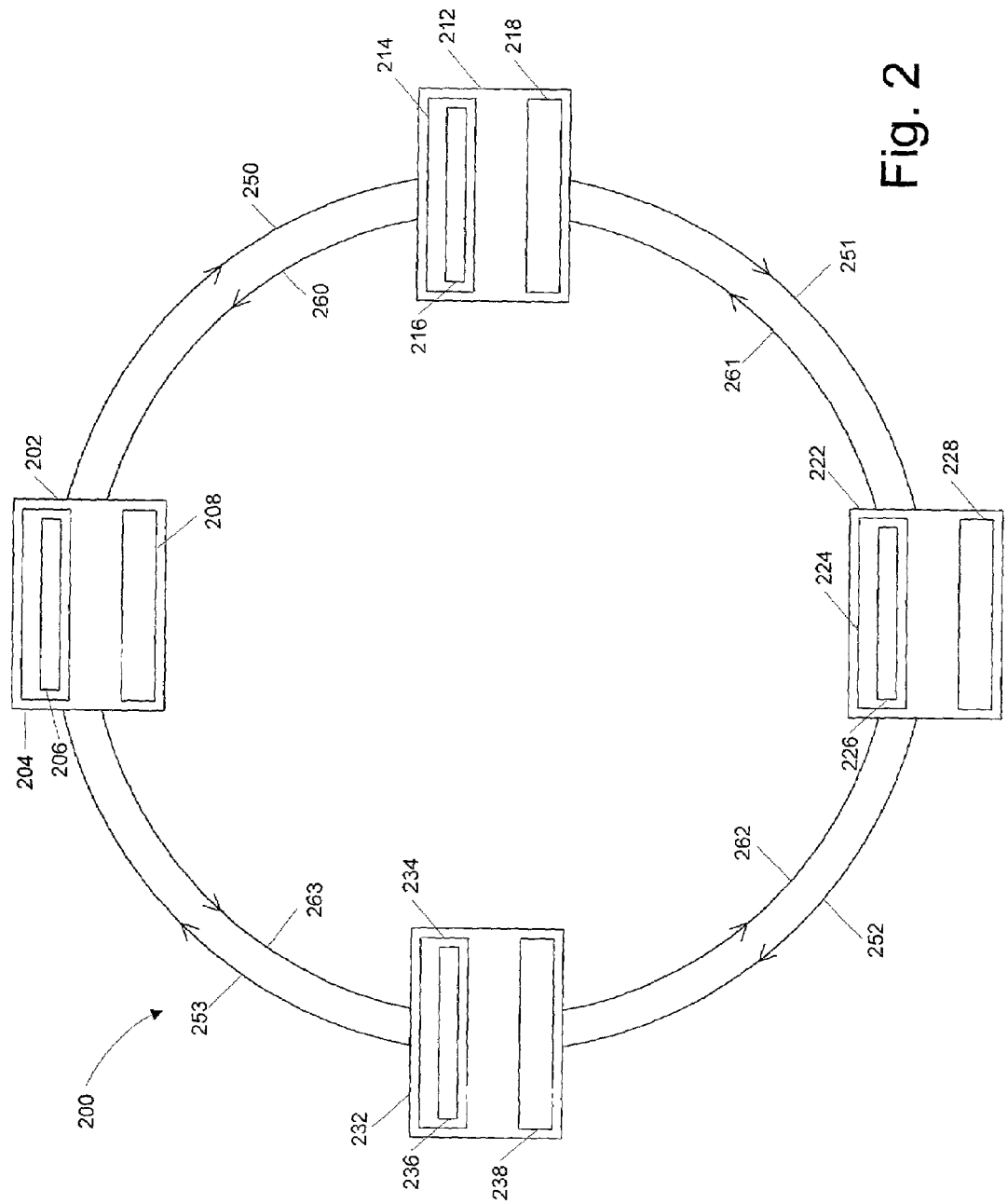
FIG. 2 illustrates an exemplary optical communications network having a plurality of nodes.

FIG. 2 illustrates an embodiment of an optical communications network or sub-network 200 having a plurality of nodes 202, 212, 222 and 232 is shown. Each node 202, 212, 222 and 232 is coupled to two other nodes 202, 212, 222 and 232 by pairs of optical fibers 250, 260, 251, 261, 252, 262, 253, 263 in a ring topology. Each node 202, 212, 222 and 232 comprises a signaling channel module 208, 218, 228 and 238 for controlling communication over and processing information carried by the optical signaling channel between the nodes 202, 212, 222 and 232. In this embodiment, an optical signaling channel travels on one or more optical fibers between a node 202, 212, 222 and 232 and another network node 202, 212, 222 and 232. In the embodiment of FIG. 2, each node 202, 212, 222 and 232 also includes a processor module 204, 214, 224, 234. Nodes 212 and 232 may each further comprise a persistent storage module (not shown). In one embodiment, the persistent storage module comprises non-volatile memory or dynamic random access memory (DRAM).

In the network shown, two neighboring nodes (e.g. 202 and 212) share a persistent storage module for storing a back-up database copy of administrative information for each of these nodes. In the embodiment shown, nodes 202 and 212 share a persistent storage module and nodes 222 and 232 share persistent storage module. A remote node 202, 222 sharing the persistent storage module uses the optical signaling channel to transfer information to and from persistent storage module. Alternatively, a remote node's associated persistent storage memory may be distributed in any other node. However, those skilled in the art will recognize that while there may or may not be a persistent storage module at a particular node, each node has an administrative complex 102.

Figure 3:
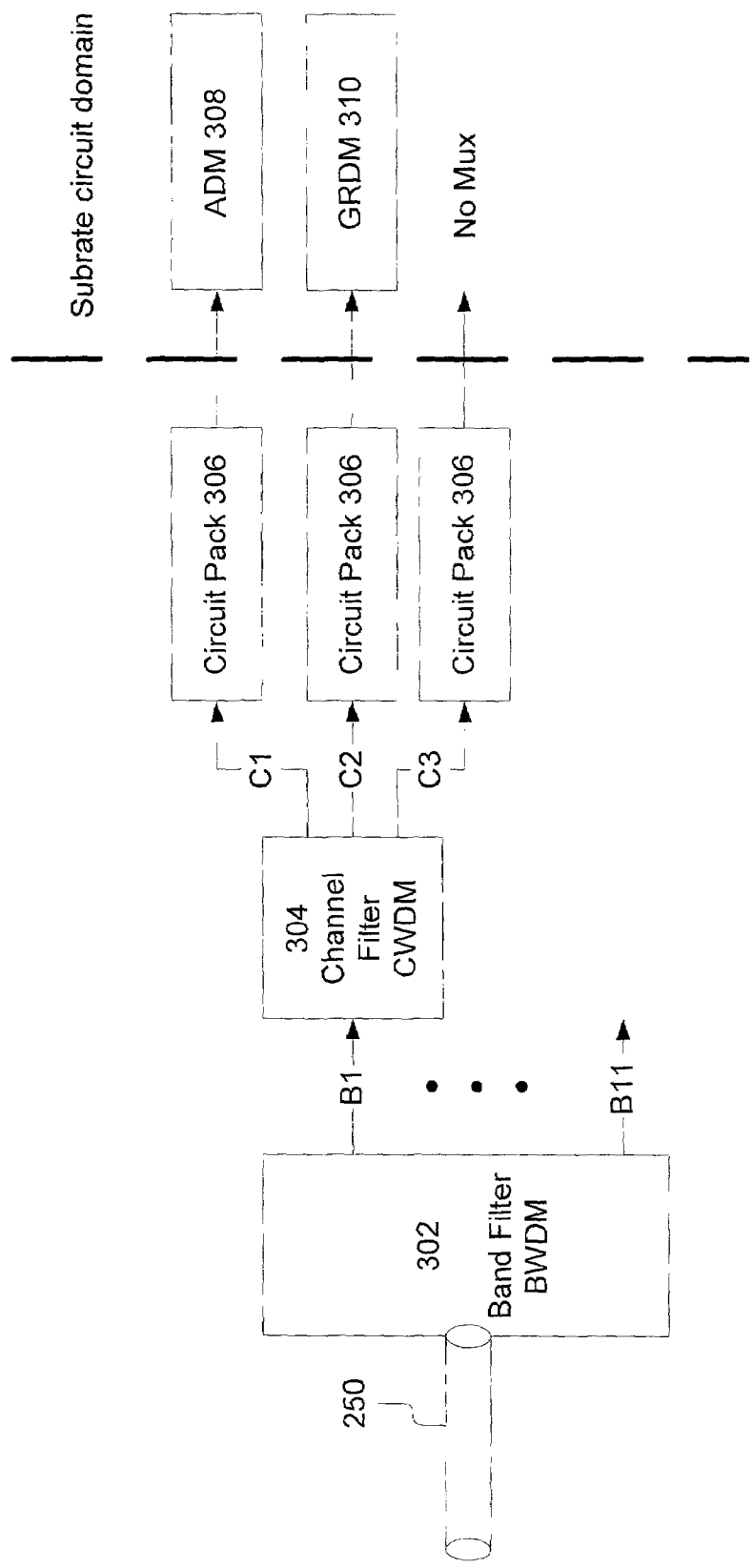
FIG. 3 illustrates a graphical representation of filtering that produces data for a particular channel, and the couplings of a channel to sources outside the network.

Referring now also to FIG. 3, a graphic representation of exemplary processing that is performed by the optical node elements 160 is shown. In an exemplary embodiment, each of the optical fibers 250, 260, 251, 261, 252, 262, 253, 263 carries a plurality of bands, each band having a plurality of channels. For example, there are preferably 33 wavelengths or channels of light carried on each of the optical fibers 250, 260, 251, 261, 252, 262, 253, 263, and these 33 channels are grouped in bands of 3 channels per band. Referring now particularly to FIG. 3, the processing of channels in a particular band are shown. At the node 100, the fiber 250 is coupled to a band filter 302 such as a band wavelength division multiplexer. The band filter 302 receives the input light from the fiber and generates a band of three channels at each output. The output of the band filter 302 is coupled to the input of a channel filter 304 such as a channel wavelength division multiplexer. The channel filter 304 has a plurality of outputs, for example 3, and separates the band of data into different channels, one at each output of the channel filter 304. Each output of the channel filter 304 is coupled to a respective circuit pack 306. As has been noted above, each circuit pack 306 can perform any number of optical processing such as routing and add/drop multiplexing. The circuit pack 306 can pass through wavelengths, regenerated channels, or optical-to-electrical and electrical-to-optical conversions for subrate circuits. The circuit pack 306 can be coupled as shown by way of example to a multiplexer (ADM) 308 or (GRDM) 310, or even no multiplexer. The existence of a multiplexer 308, 310 provides information to the system as to whether there may be subrate circuits coupled to the channel, and whether such subrate information may be accessible and presented for use in management and monitoring of the network.

D. Element Management System (EMS)

Figure 4:
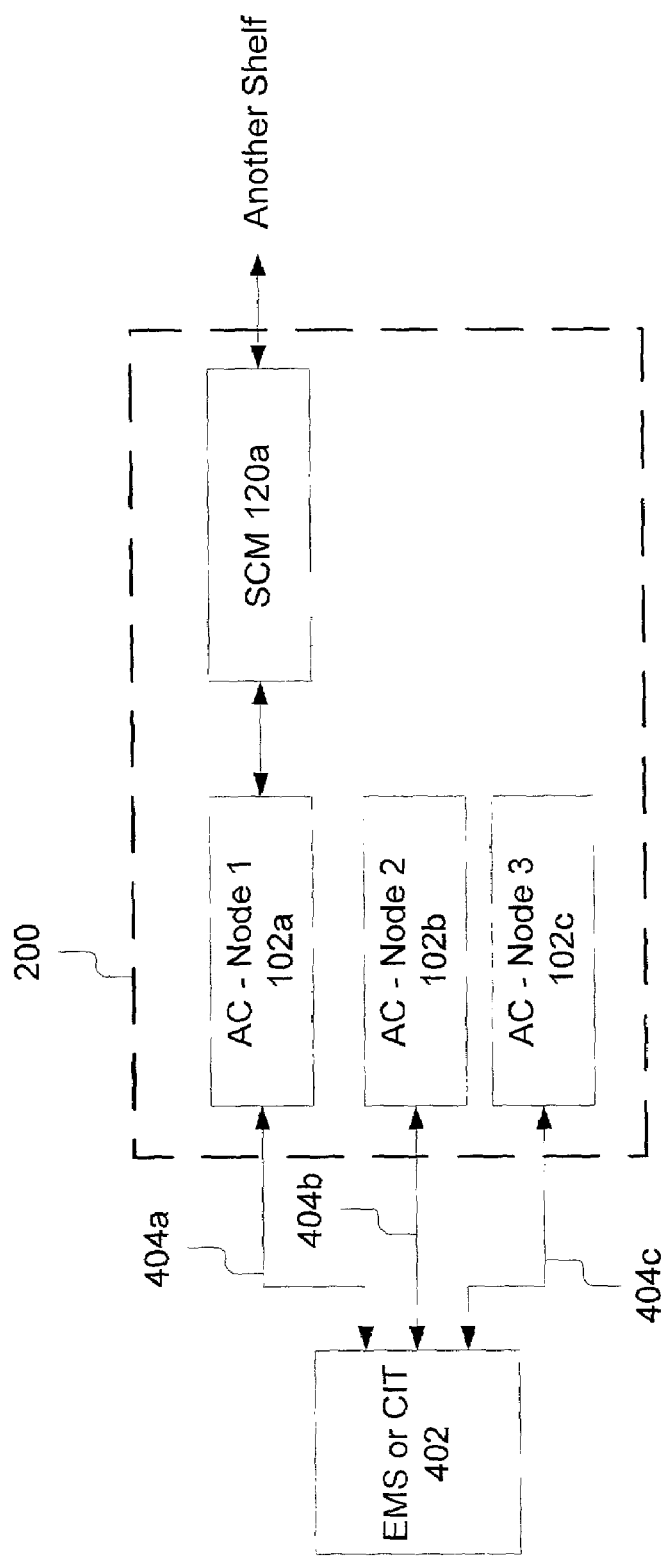
FIG. 4 illustrates a block diagram showing the coupling between the administrative complexes of nodes in a network and an element management system or craft interface terminal in accordance with the present invention.

Referring now to FIG. 4, the coupling of the nodes 100 of the network 200 to the element management system (EMS) 402 for administration and control of the network 200 is shown in more detail. The discussion below will focus on an element management system 402 that monitors and manages a sub-network or a plurality of sub-networks. Those skilled in the art will recognize that the description applies equally for a craft interface terminal (CIT), the primary difference being that a CIT can only be used to monitor a single sub-network whereas an element management system 402 can monitor multiple networks.

As shown in FIG. 4, the EMS 402 is coupled to the administrative complex 102a, 102b and 102c of each node 100 by respective signal lines 404a, 404b and 404c. These signal lines 404a, 404b and 404c have been described above with reference to FIG. 1, and preferably include 1) an input/output Ethernet interface 119 for communication to a central office local area network; 2) a craft interface 118 such as a serial interface for a craft RS-232C; 3) an alarm input/output external interface 121 and another input/output interface 117 for other indicators to be sent to the element management system 402. FIG. 4 also illustrates how the administrative complex 102a is coupled to the signal channel module 120a for communicating administrative information between the nodes 100 of the network 200 and other shelves that may contain other nodes. Using the couplings shown in FIG. 4, the element management system 402 can communicate with the administrative complex 102a, 102b, 102c of each node 100 to poll it for information regarding provisioning of band, channels, subrate information, circuit information and subrate circuit information. Those skilled in the art will recognize that such monitoring and management information is provided by some existing optical networks, but only in response to requests for such information by a system administrator via the element management system 402.

Figure 5:
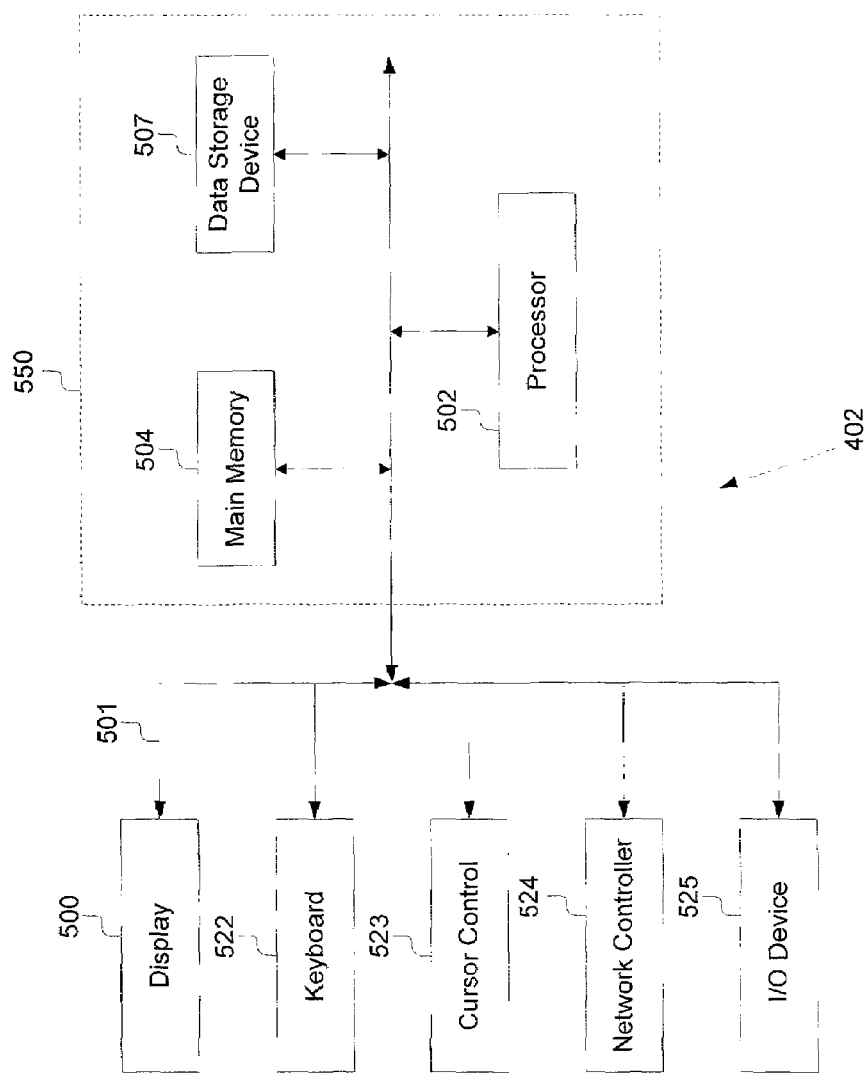
FIG. 5 illustrates a block diagram for a preferred embodiment of an element management system including the channel map display system of the present invention.

Referring now also to FIG. 5, the element management system 402 is shown in more detail. FIG. 5 is a block diagram of one embodiment of the element management system 402. The element management system 402 includes a control unit 550. Control unit 550 may comprise an arithmetic logic unit, a microprocessor, a general purpose computer, or some other information appliance equipped to provide electronic display signals to display device 500. In one embodiment, control unit 550 comprises a general purpose computer having a graphical user interface, which may be generated by, for example, a program written in Java running on top of an operating system like WINDOWS® or UNIX® based operating systems. In one embodiment, the channel map and other user interfaces are generated by one or more application programs executed by control unit 550. In one embodiment, the operating system and/or one or more application programs executed by control unit 550 provide "drag-and-drop" functionality and tool tip functionality.

As shown in FIG. 5, the control unit 550 is shown including processor 502, main memory 504, and data storage device 507, all of which are communicatively coupled to system bus 501.

Processor 502 processes data signals and may comprise various computing architectures including a complex instruction set computer (CISC) architecture, a reduced instruction set computer (RISC) architecture, or an architecture implementing a combination of instruction sets. Although only a single processor is shown in FIG. 5, multiple processors may be included.

Main memory 504 may store instructions and/or data that may be executed by processor 502. The instructions and/or data may comprise code for performing any and/or all of the techniques described herein. Main memory 504 may be a dynamic random access memory (DRAM) device, a static random access memory (SRAM) device, or some other memory device known in the art. The memory 504 is described in more detail below with reference to FIG. 6. In particular, the portions of the memory 504 for generating and displaying the channel map user interface are shown in detail.

Data storage device 507 stores data and instructions for processor 502 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 501 represents a shared bus for communicating information and data throughout control unit 550. System bus 501 may represent one or more buses including an industry standard architecture (ISA) bus, a peripheral component interconnect (PCI) bus, a universal serial bus (USB), or some other bus known in the art to provide similar functionality.

Additional components coupled to control unit 550 through system bus 501 include display device 500, a keyboard 522, a cursor control device 523, a network controller 524 and an I/O device 525. Display device 500 represents any device equipped to display electronic images and data as described herein. Display device 500 may be a cathode ray tube (CRT), liquid crystal display (LCD), or any other similarly equipped display device, screen, or monitor. Keyboard 522 represents an alphanumeric input device coupled to control unit 550 to communicate information and command selections to processor 502. Cursor control 523 represents a user input device equipped to communicate positional data as well as command selections to processor 502. Cursor control 523 may include a mouse, a trackball, a stylus, a pen, a touch screen, cursor direction keys, or other mechanisms to cause movement of a cursor. Network controller 524 links control unit 550 to a network that may include multiple processing systems and particular elements of the node 100. The network of processing systems may comprise a local area network (LAN), a wide area network (WAN) (e.g., the Internet), and/or any other interconnected data path across which multiple devices may communicate.

One or more I/O devices 525 are coupled to the system bus 501. For example, the I/O device 525 may be an audio device 525 equipped to receive audio input and transmit audio output. Audio input may be received through various devices including a microphone within I/O device 525 and network controller 524.

It should be apparent to one skilled in the art that control unit 550 may include more or less components than those shown in FIG. 5 without departing from the spirit and scope of the present invention. For example, control unit 550 may include additional memory, such as, for example, a first or second level cache, or one or more application specific integrated circuits (ASICs). Similarly, additional components may be coupled to control unit 550 including, for example, image scanning devices, digital still or video cameras, or other devices that may or may not be equipped to capture and/or download electronic data to control unit 550.

Figure 6:
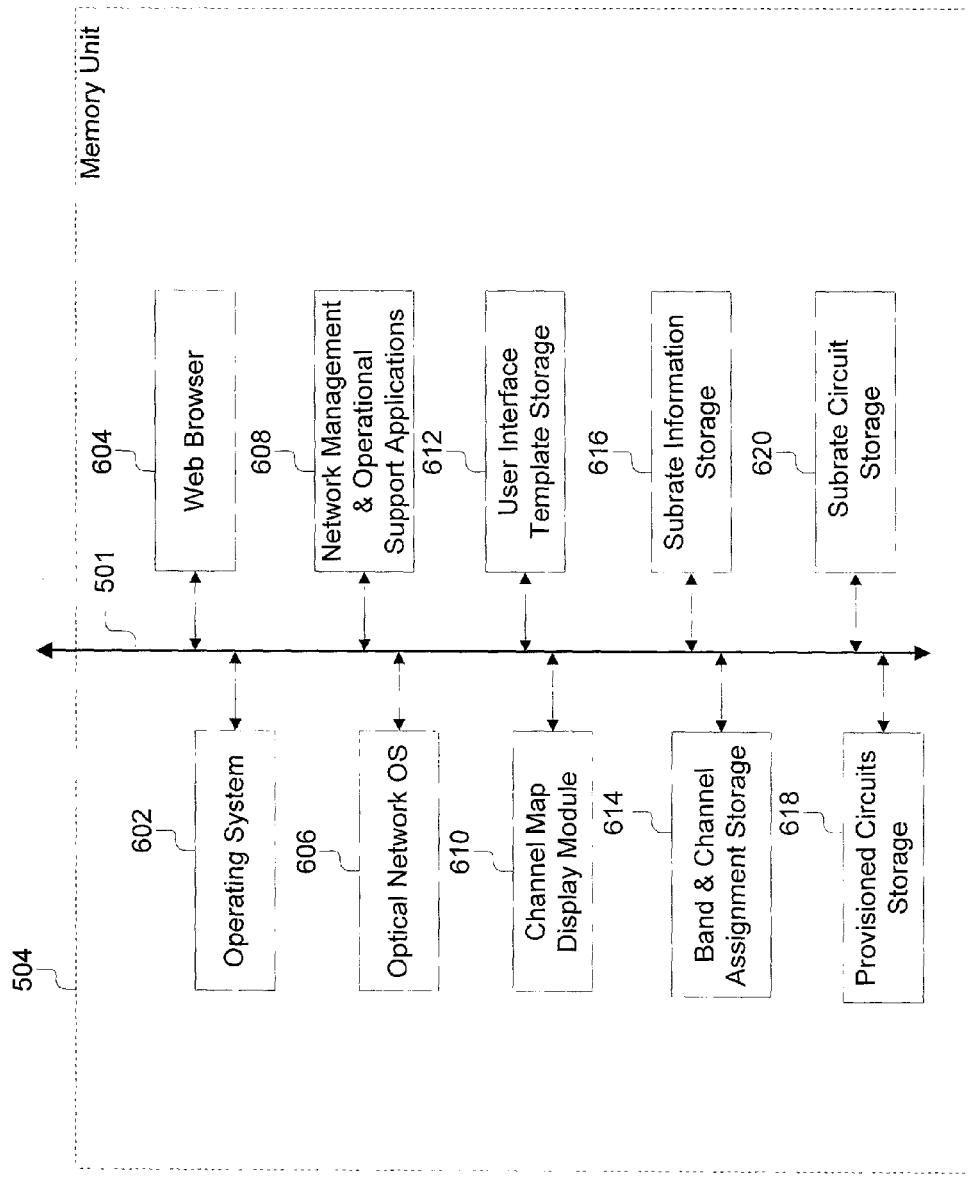
FIG. 6 illustrates a block diagram of the memory of the element management system of FIG. 5.

Referring now to FIG. 6, the memory 504 of the element management system 402 is shown in more detail. The memory 504 preferably comprises an operating system 602, a web browser 604, a optical network operating system 606, a network management and operational support applications 608, a channel map display module 610, a storage of user interface templates 612, storage for band and channel assignments 614, subrate information storage 616, provisioned circuits storage 618, and subrate circuit storage 620. As noted above, the memory unit 504 stores instructions and/or data that may be executed by processing unit 502. The instructions and/or data may comprise code for performing any and/or all of the techniques described herein. These modules 602–620 are coupled by bus 501 to the processing unit 502 for communication and cooperation to provide the element management system 402 with the ability to generate and display a channel map. Those skilled in the art will recognized that while the present invention will now be described as modules or portions of a memory 504 of an element management system 402, the modules or portions may also be stored in other media such as permanent data storage and may be distributed across a network having a plurality of different computers such as in a client/server environment.

The operating system 602 is preferably one of a conventional type such as, for example, WINDOWS®, UNIX®, or LINUX® based operating systems. Although not shown, the memory unit 504 may also include one or more application programs including, without limitation, word processing applications, electronic mail applications, spreadsheet applications, and web browser applications.

It is well understood by those skilled in the art that multiple computers can be used in the place of a single computer by applying the appropriate software, hardware, and communication protocols. For instance, data used by a computer often resides on a hard disk or other storage device that is located somewhere on the network to which the computer is connected and not within the computer enclosure itself. That data can be accessed using NFS, FTP, HTTP or one of many other remote file access protocols. Additionally, remote procedure calls (RPC) can execute software on remote processors not part of the local computer. In some cases, this remote data or remote procedure operation is transparent to the user of the computer and to even to the application itself because the remote operation is executed through the underlying operating system as if it were a local operation.

The web browser 604 is of a conventional type that provides access to the Internet and processes HTML, XML or other mark up language to generated images on the display device 500. For example, the web browser 604 could be Netscape Navigator or Microsoft Internet Explorer.

The optical network operating system 606 provides control of the optical layer. The optical network operating system 606 is a program for performing the low level tasks necessary to control, monitor and maintain the optical layer of the network. This may be a conventional optical network operating system such as that provided as a portion of the OPTX™ Software Suite manufactured and sold by ONI Systems Corp. of San Jose, Calif. The optical network operating system 606 includes functionality such as embedded subnetwork level control and management, optical power balancing, automated protection switching management, and administration of software provisionable, rate-tunable services.

The network management and operational support applications 608 are programs that run optical network operating system 606. The network management and operational support applications 608 provide a variety of tools for designing, maintaining and managing an optical network. These applications may be a conventional type such as that provided as a part of the OPTX™ Software Suite manufactured and sold by ONI Systems Corp. of San Jose, Calif.

The channel map display module 610 is a system for retrieving data for a channel map, for storing the data for the channel map, and for generating a channel map user interface. The channel map display module 610 is coupled to the bus 501 for communication with the network management and operational support applications 608, the storage of user interface templates 612, the storage for band and channel assignments 614, the subrate information storage 616, the provisioned circuits storage 618, and the subrate circuit storage 620. The channel map display module 610 interacts with these components as will be described below with reference to FIGS. 7A–9 to generate the channel map user interface of the present invention. The channel map display module 610 also retrieves additional information and presents it to the user with the additional aspects described below with reference to FIGS. 10–16.

The storage of user interface templates 612 is used to store the user interface templates that are combined with data from the nodes 100 to form instances of the channel map. The present invention advantageously includes a plurality of different templates for displaying different aspects of the channel map. For example, one template is provided for showing a channel map of connections between two nodes, while another template is provided to show all the bands and circuits in an entire sub-network. The present invention also provides other templates for circuit provisioning information and subrate circuit information. The various templates are described below with specificity with reference to FIGS. 10–16.

The band and channel assignments storage 614 is used to store data retrieved from the administrative complexes 102 of the nodes 100. In particular, the channel map display module 610 stores the band and channel assignments used for particular circuits in this band and channel assignments storage 614. The storage 614 stores other information about other aspects of the circuit packs 306 and their properties such as whether regeneration is performed and what type, whether channels and/or bands are passed through. The information is stored in tables at the administrative complex 102 of each node. This information is retrieved and stored locally so that the channel map display module 610 can use the data and replace it with graphics that become portions of the channel map user interface.

The subrate information storage 616 is used to store data retrieved from the administrative complexes 102 of the nodes 100. In particular, the channel map display module 610 stores the subrate circuit pack connections in the subrate information storage 616. This information identifies the presence of multiplexer connections to the circuit pack 306. These indicate possible subrate circuits that can be provisioned over the optical circuits. This information is obtained from the subrate interface table of administrative complex 102. This information is retrieved and stored locally so that the channel map display module 610 can use the data and replace it with graphics that become portions of the channel map user interface.

The provisioned circuit storage 618 is used to store data retrieved from the administrative complexes 102 of the nodes 100. In particular, the channel map display module 610 stores information about the provisioned circuits in the provisioned circuit storage 618. The channel map display preferably shows provisioned circuits as solid colored lines. The color of the lines denotes the outstanding alarm condition on the circuit at the time. For example, a red color indicates a critical problem, an orange color indicates an major problem, yellow indicates a minor problem, and green indicates no alarm conditions. The provisioned circuit storage 618 is used to store the alarm state for each provisioned circuit. The channel map display module 610 is able to read this information from the provisioned circuit storage 618, translate it and use it to modify the color of the lines representing provisioned circuits in the channel map user interface. The channel map display module 610 additionally shows the administrative (locked/unlocked) state of the circuits with icons in the channel map user interface. Provisioned circuit information comes from the network path table of the administrative complex 102 and the outstanding alarm condition is obtained after alarms on the end point of the circuit are correlated to the circuit itself. This correlation is done by the element management system 402.

The subrate circuit storage 620 is used to store data retrieved from the administrative complexes 102 of the nodes 100. In particular, the channel map display module 610 stores details on the subrate circuits that are provisioned in the network 200 in the subrate circuit storage 620. The channel map display preferably shows provisioned subrate circuits with a multiplexer icon at the termination point of the circuit. The channel map display module 610 is able to read this information by querying the subrate circuits list on the appropriate optical circuit. This information comes from the subrate path table of the administrative complex 102. The subrate circuit storage 620 stores this queried information as well as the subrate circuit information.

E. Methods of the Present Invention

Referring now to FIGS. 7A–9, the operation of the channel map display module 610 will be described.

Figure 7A:
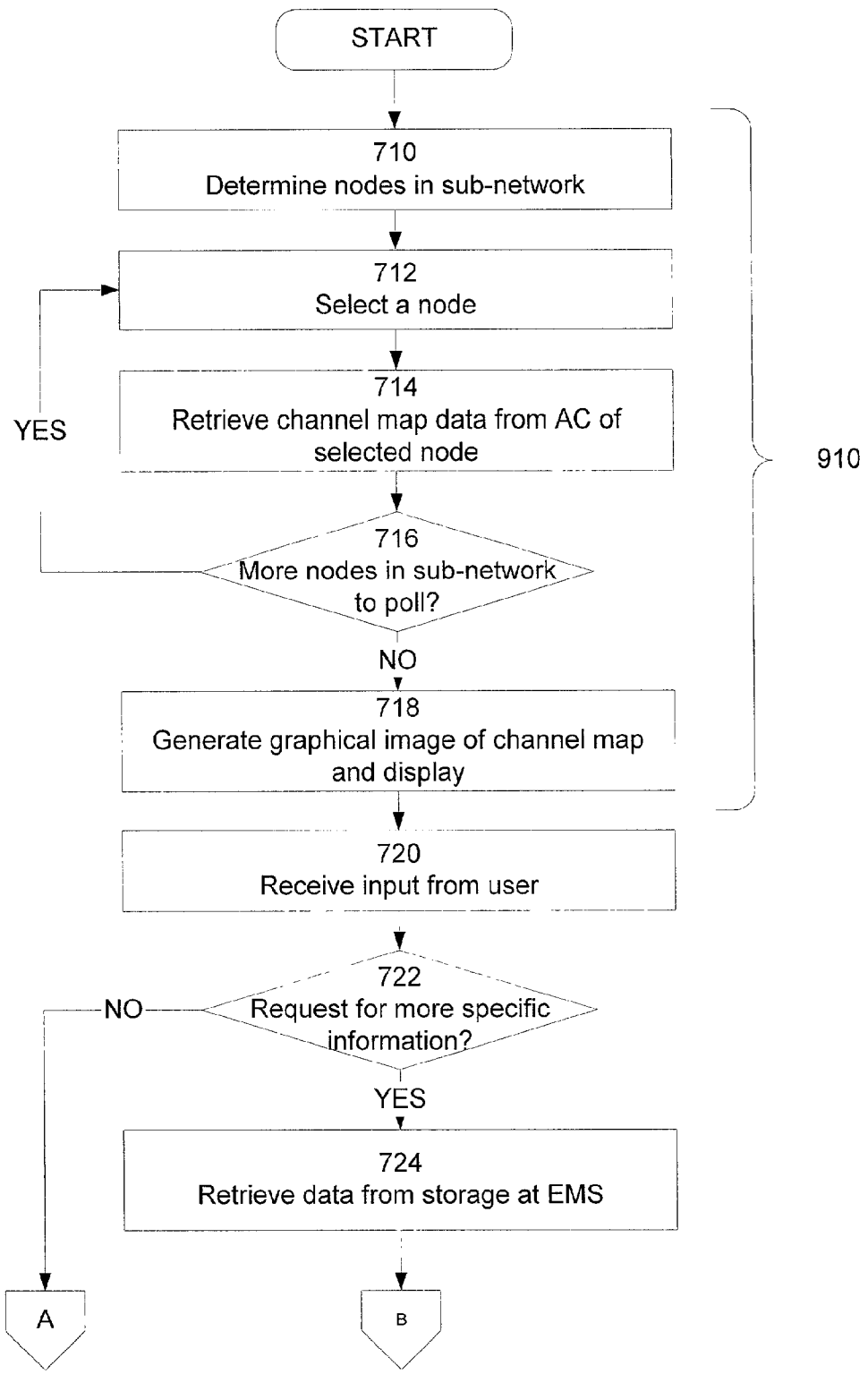
FIGS. 7A–7B are a flowchart of a method for generating and displaying a channel map according to the present invention.
Figure 7B:
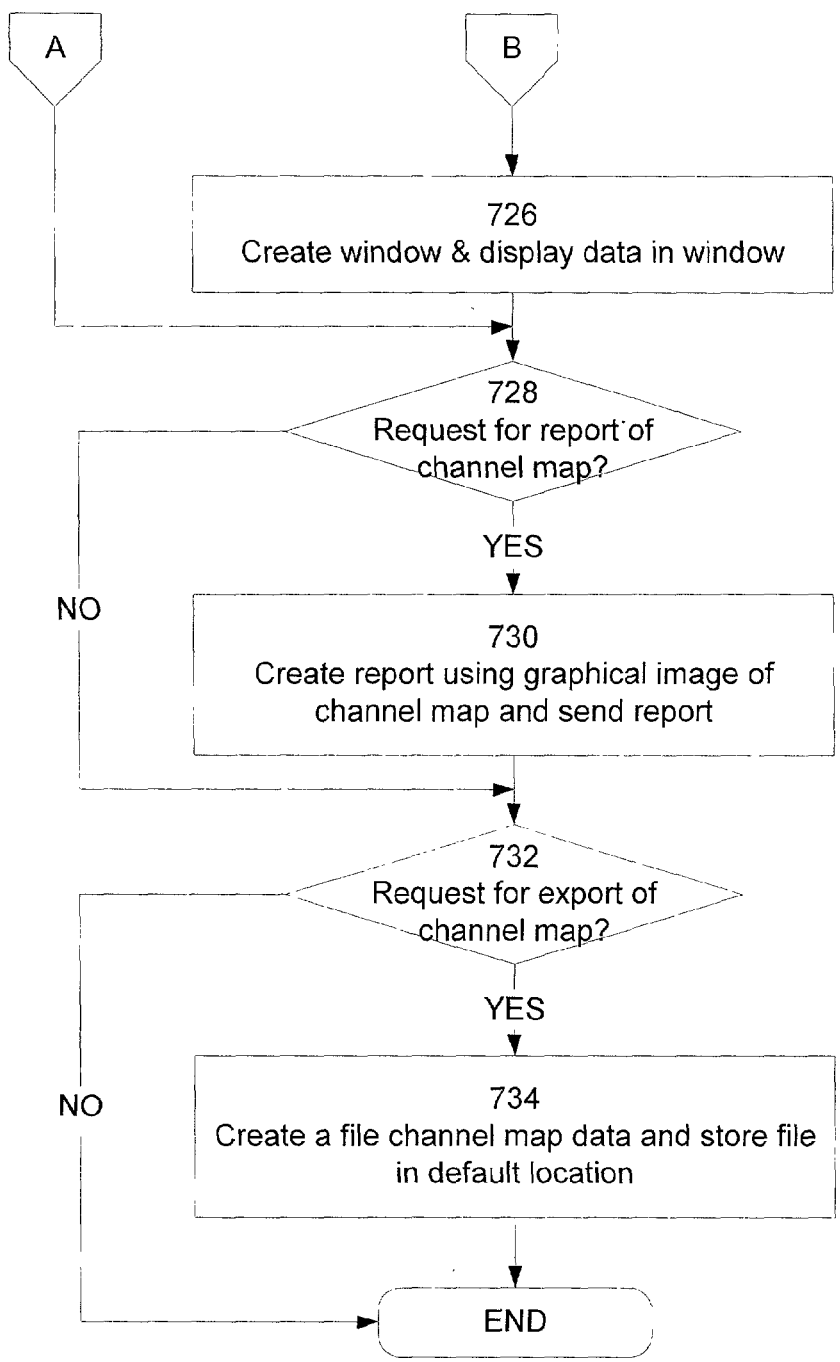

FIGS. 7A and 7B show a preferred embodiment for a method of generating and displaying a channel map according to the present invention. The process begins by determining 710 the nodes in the network 200 such as from the element management system 402. Then a node 100 is selected 712 for additional processing. The channel map display module 610 then retrieves channel map data from the administrative complex 102 corresponding to the node 100 selected. This process and the channel map data are described in more detail below with reference to FIG. 8. Essentially, the data retrieved by the channel map display module 610 from the administrative complex 102 is that data described above with reference to the storage for band and channel assignments 614, subrate information storage 616, provisioned circuits storage 618, and subrate circuit storage 620 for the particular selected node. After step 714, the method determines if there are more nodes 100 in the network 200 to poll for data. If there are, the method returns to step 712 to select another node and retrieve its channel map data. If not the process continues to step 718. In step 718, the method generates a graphical image of the channel map and displays it. Such exemplary displays are show in FIGS. 10 and 12, and will be described in more detail below. The displays are created beginning with a channel map template from the user interface template storage 612. Then the channel map display module 610 adds to the template using the date from the storage modules 614, 616, 618, 620. The channel map display module 610 translates the data into graphic parts such as icons, line segments or color attributes to generate the display. As shown in FIG. 7A, these steps, denoted by 910, are performed both to generate the display as well as update it.

Figure 11:
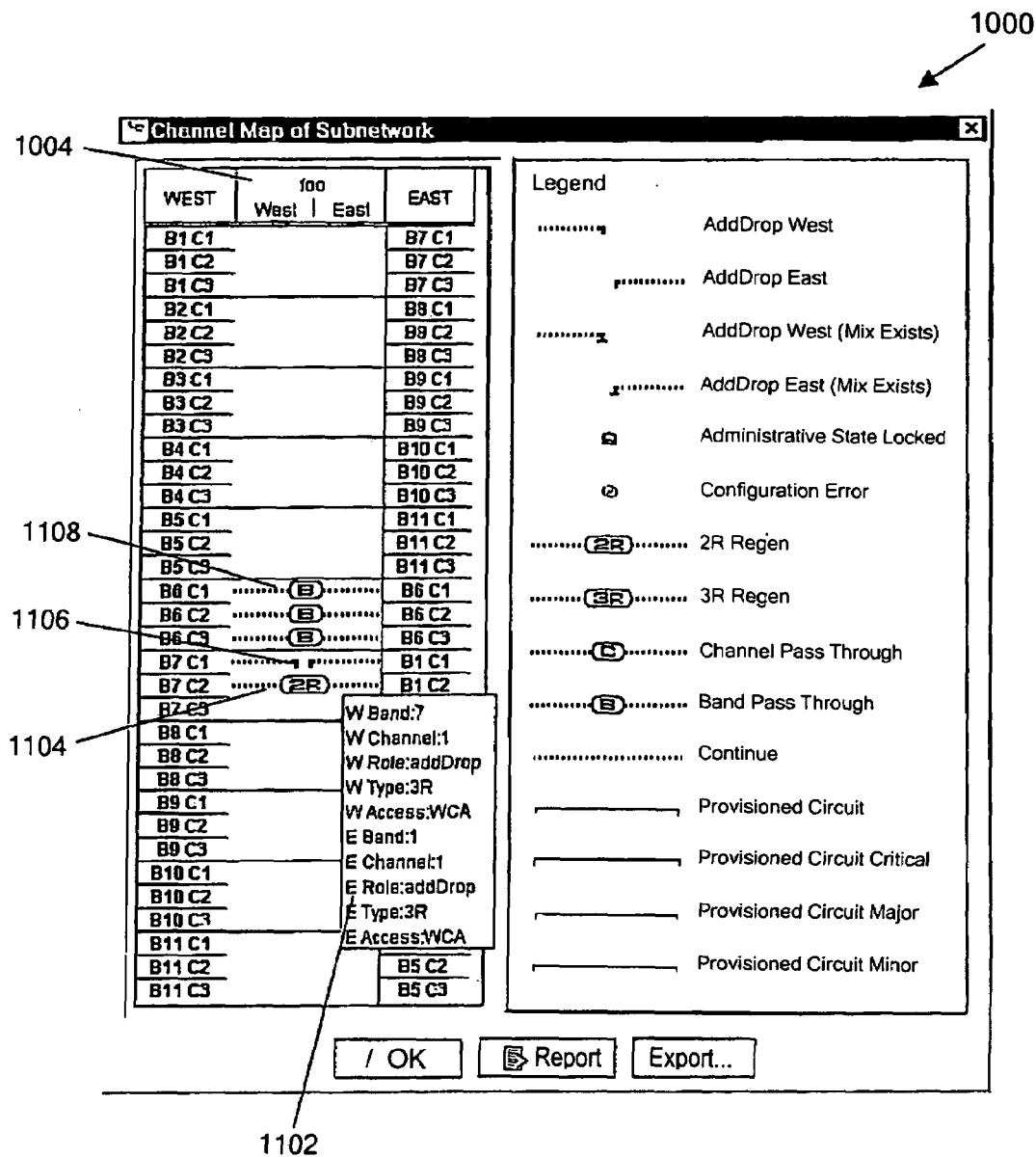
FIG. 11 illustrates a graphical representation of the first embodiment of the user interface for showing a channel map and circuit information.
Figure 13:
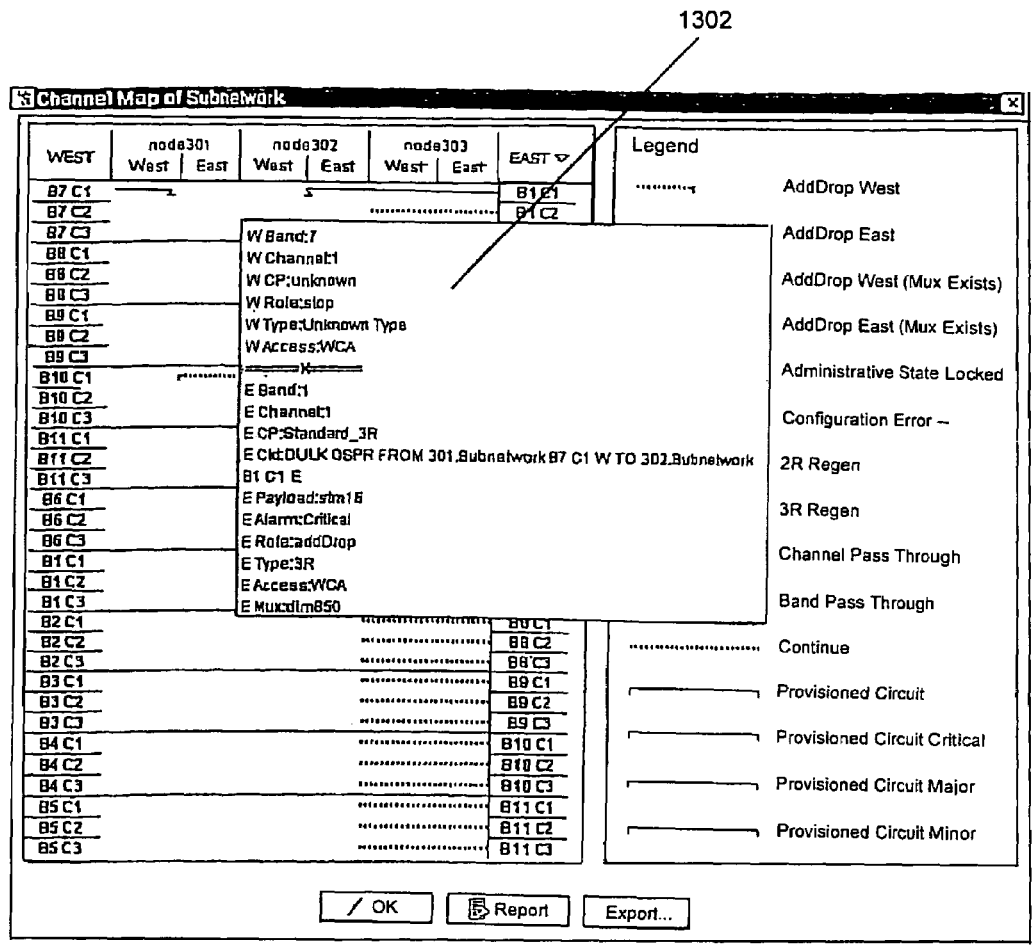
FIG. 13 illustrates a graphical representation of the first embodiment of the user interface for showing a channel map and circuit information.

Once the display is generated and presented, the process may continue since the channel map display advantageously provides additional information in response to user input. In step 720, the user may input requests for more detail than that provided by the base level of the channel map user interface. The method tests 722 whether the input was a request to display additional information. If the method determines that the input was a request to display more channel or band information, then method retrieves 724 the additional data from the storage modules 614, 616, 618, 620 at the element management system 402, and creates a window and displays 726 the data in the window. For example, the user may use a tool tip feature of the present invention and place the cursor over a provisioned circuit. In response to such input, the channel map display module 610 creates a window with circuit information such as shown in FIGS. 11 and 13 below.

After step 726 or if the method determines if the input was not a request to display additional information, the method continues in step 728. In step 728, the method determines if the input is a request for a report of the channel map. If the input was a request for a report of the channel map, the method creates 730 a report using the graphical image of the channel map and sends the report to a default printer. Those skilled in the art will recognize that in another embodiment, the method generates the graphical image in an HTML file format and opens the file in a web browser.

After step 730 or if the method determines if the input was not a request for a report of the channel map, the method continues in step 732. In step 732, the method determines if the input is a request to export the channel map data as a file. If the input was a request to export the channel map data as a file, the method creates 734 a file of channel map data as shown in FIG. 16 below and stores the file in a default location. The file is preferably in HTML or text as a comma separated values (csv) file, however, those skilled in the art will realize that various other file formats may be used. Alternatively, the file could be sent by e-mail to a default location. If the input was not a request to export the channel map data as a file, the method is complete and ends.

Figure 8:
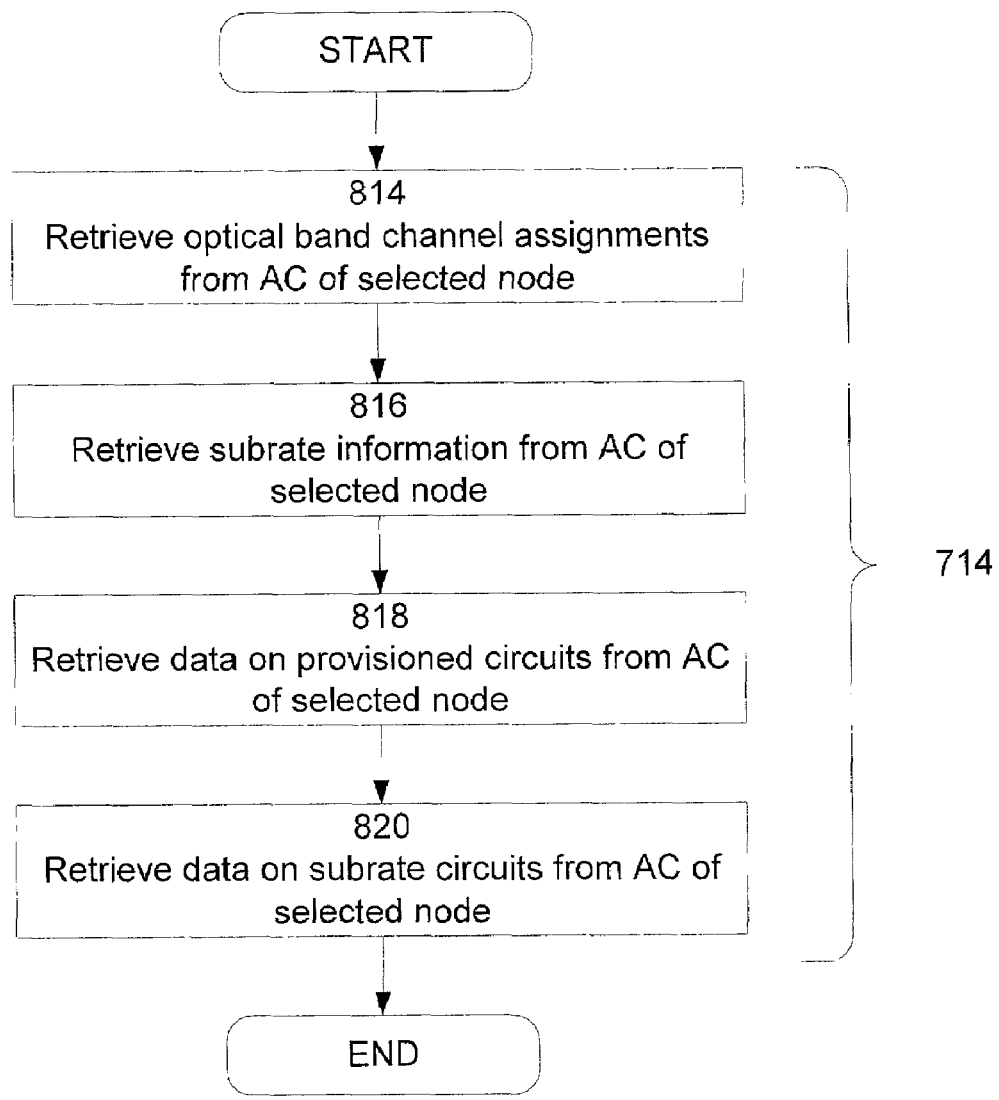
FIG. 8 is a flowchart of a method for obtaining channel data from an administrative complex.

Referring now to FIG. 8, a preferred method for retrieving channel map data from the administrative complex 102 corresponding to the selected node 100 is shown. The method for retrieving the information 714 preferably is performed in four steps. While the method is described below in a particular order, those skilled in the art will recognize that these steps may be performed in any order.

The method begins by retrieving 814 the optical band and channel assignments from the administrative complex 102 of the selected node 100. In particular, the band and channel assignments used for particular circuits are retrieved from the administrative complex 102. Once the data is retrieved, it is stored in the band and channel assignments storage 614 for later use by the channel map display module 610. The information is retrieved from a network channel table at the administrative complex 102. Additionally, other information about aspects of the circuit packs 306 and their properties such as whether regeneration is performed and what type, whether channels and/or bands are passed through is also retrieved.

Next, the method retrieves 816 subrate information from the administrative complex 102 of the selected node 100. The channel map display module 610 retrieves subrate information from the subrate interface table of administrative complex 102 and stores it in the subrate information storage 616. The subrate information includes subrate circuit pack connections such as the presence of multiplexer connections to the circuit pack 306. These indicate possible subrate circuits that may be provisioned over the optical circuits.

Next, the method retrieves 818 data on provisioned circuits from the administrative complex 102 of the selected node 100. The channel map display module 610 retrieves information about the provisioned circuits from the network path table of the administrative complex 102 and stores the information in the provisioned circuit storage 618. The information includes provisioned circuits, the alarm state of each provisioned circuit, and the administrative state of each provisioned circuit. The outstanding alarm conditions are obtained after alarms on the end point of the circuit are correlated to the circuit itself. This correlation is done on by the element management system 402.

Finally, the method retrieves 820 data on provisioned subrate circuits from the administrative complex 102 of the selected node 100. The channel map display module 610 retrieves information about the provisioned subrate circuits from the subrate path table of the administrative complex 102 and stores the subrate circuit storage 620.

Figure 9:
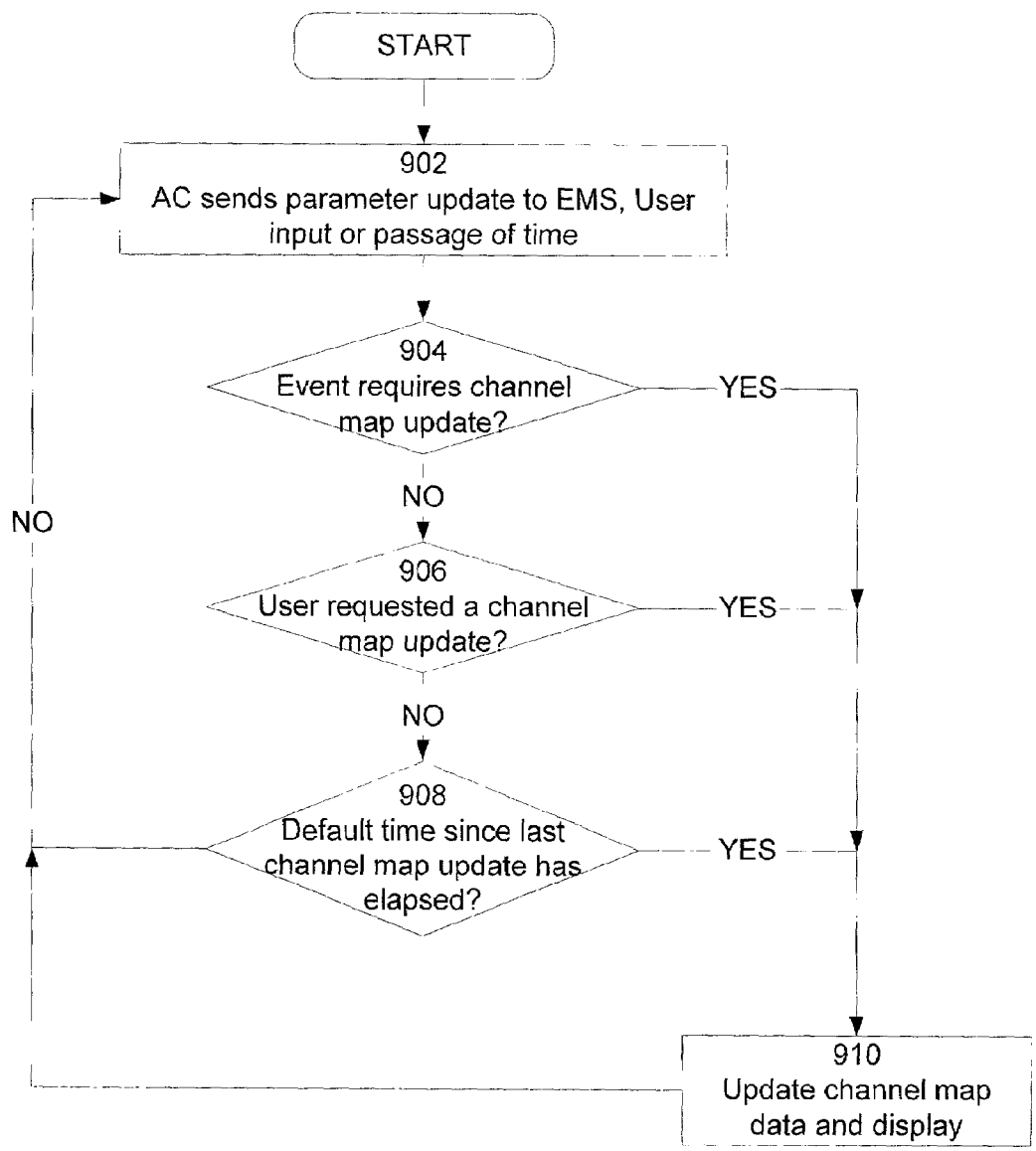
FIG. 9 is a flowchart of a preferred method for updating a channel map display according to the present invention.

Referring now to FIG. 9, the preferred method for real-time updating of the channel map will be described. One of the key advantages of the channel map of the present invention is that it provides information necessary to provision and manage the network in a single display. The present invention also provides for automatic refresh of the information based on content changes. The channel map refreshes when the content changes to always show the up to date information. A new add-drop addition for instance would be reflected automatically in the channel map view without the user having to close and reopen the channel map. A preferred method for performing this automatic updating is shown in FIG. 9. The method begins in step 902 by monitoring for external event. In the preferred embodiment, there are a number of different events that may cause the channel map to be updated. For example, an alarm condition, change in administrative condition or other information being sent from the administrative complex 102 to the element management system 402 is one such event. Another event is user input requesting that the channel map be updated. Yet another event is the passage of time. The present invention provides a default time after which the channel map is updated. The user preferably sets this default time so that the channel map might be updated every 3 minutes, for example. During the monitoring state, the method determines 904 if the event or communication from the administrative complex requires a channel map update. This is determined by an alarm condition, a change to a channel or band provision, and change in administrative state. If such an event is detected the method proceeds to step 910 to update the channel map as has been described in FIG. 7A. Otherwise, the method continues to step 906 to test whether the user has input a request for a channel map update. If so, the method proceeds to step 910 to update the channel map, otherwise the method continues to step 908. In step 908, the method determines if the default time has elapsed since the last channel map update. If so, the method continues in step 910 to perform a channel map update after which the method returns to monitor for changes in step 902. Otherwise, if the default time has not elapsed, the method proceeds directly to step 902 to continue monitoring. As illustrated, the method repeatedly performs step 904, 906 and 908 to monitor whether the channel map should be updated.

F. User Interface

Referring now to FIGS. 10–16 various embodiments of the channel map user interface or display are shown. The channel map display is extremely useful in both the setup stage of the network and in the monitoring and maintenance stage. The channel map facilitates the setup of the network and provisioning of services. The graphical display indicating the circuit packs and the regeneration and pass through information provide all the required information for the user to select and provision services. The channel map display can also be used to monitor the network as the colored circuits help in quickly identifying circuits with problems and also help to visually identify the route of these circuits and their band/channel/side information.

Figure 10:
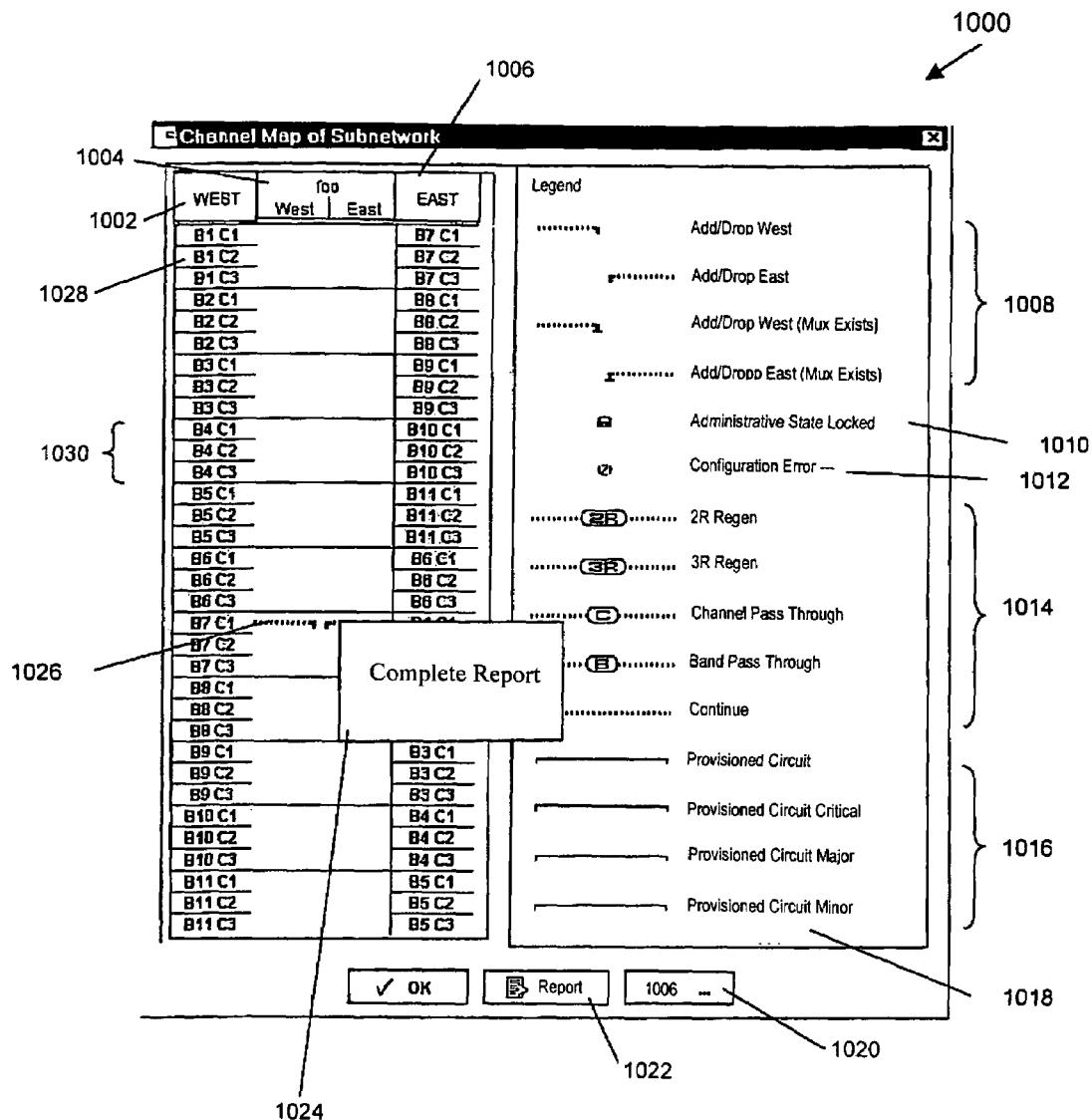
FIG. 10 illustrates a graphical representation of a first embodiment of the user interface for showing a channel map.

FIG. 10 shows a graphical representation of a first embodiment of the user interface 1000 for showing a channel map. The user interface 1000 shown in FIG. 10 shows a channel map display for a single node of a sub-network and shows the band and channel allocations for that node. The user interface window includes three columns 1002, 1004 and 1006 adjacent to a legend 1018. The first column 1002 provides labels for the bands and channels on a first direction (west) to/from the node. The third column 1006 provides labels for the bands and channels on a second direction (east) to/from the node. The center column 1004 is positioned between the first and third columns 1002, 1006 and displays channel and band allocation information. The center column 1004 advantageously has a plurality of cells with left and right portions for displaying west and east side information for the node. The left half of the cell denoted West and the right half denoted East. This organization makes the user interface more readable because the lines in the cells correspond to connections made by the node. The first column 1002 and the third column 1006 are divided into a number of rows 1028 with each row 1028 representing a particular channel. The rows 1028 are each labeled with a unique channel identifier that includes a row and channel designation. While the exemplary user interface 1000 shown has 33 such rows 1028, each uniquely identified, those skilled in the art will recognize that the user interface 1000 may have any number of rows corresponding to the number of channels in the network. Groups of cells are further delineated in the center colurn 1004 into bands 1030 as shown. The channels within a band are advantageously grouped together to create 11 horizontal partitions. The 3 channels within a band grouped in this fashion provide easier readability. This grouping was also advantageous since the channels within a band may share common properties.

The user interface 1000 also includes a legend 1018. The legend 1018 includes all the icons or graphic images that may be placed in the cells of the center column 1004. The user interface 1000 advantageously provides a "one click split pane" function in which with one click on this split pane the legend panel 1018 could be closed to conserve space or opened for easy reference. Each of the icons has an associated text description to aid the user in understanding what each icon represents. For example, a group of icons 1008 indicate whether the node is performing an add/drop function (and direction) and whether a multiplexer exists. Multiplexer connections to the circuit pack 306 are included in the channel map display. This extends the display to include subrate level service parameters as well as the optical information. A lock icon 1010 is used to indicate a locked state for channel. Another icon 1012 is used to show a configuration error on channel. This information is added graphically to lines that represent circuits formed using channels. The user interface 1000 advantageously provides lines to indicate circuits. The lines may be dashed to indicate a non-provisioned state and solid to indicate provisioned 1016. Once a circuit has been provisioned, colors are used to visually indicate if a circuit is provisioned, major, minor, or critical. One such exemplary non-provisioned circuit 1026 is shown in FIG. 10. While the present invention uses colors, a dashed format and a solid format, those skilled in the art will recognize that a variety of other combinations of visually distinct formatting may be alternatively used. The legend 1018 also provides icons 1014 to indicate any processing that occurs at the node such as 2R regeneration, 3R generation, Channel Pass Through or Band Pass Through. The 2R/3R regeneration and Band and Channel Pass Through (BPT and CPT respectively) information were shown with special icons to be readily visible. The user interface 100 also includes buttons 1020, 1022 for generating a printed report or exporting the channel map. The export button 1020 allows the channel map to be exported into a file in 'csv' (comma separated values) format. This facilitates the import of the channel map values into third party applications by an Excel spreadsheet.

The user interface 1000 also provides functionality for providing additional information or generating detailed reports that is overlaid on the channel map image. As shown in FIG. 10 by way of example, a pop up menu 1024 of supported operations is generated over the channel map image in response to the user positioning the cursor over a circuit and right clicking. This provides an easy way in which the user can generate additional information, generate reports or transition to other channel map images.

Referring now to FIG. 11, the first embodiment of the user interface 1000 can provide additional channel and circuit information in a window 1102. The presentation of additional information is preferably done with the multi-line tool-tip that presents the channel information if the cursor is placed over the image of the icon representing the channel in the second column 1004. The window 1102 shows more detailed information about a particular channel such as the band, channel, side, circuit pack type, access type etc. FIG. 11 also illustrates examples of channel information providing a series of channels in the same band. For example, one channel has 2R regeneration, one channel has add/drop multiplexers in both the east and west directions, and other channels are band pass through.

Figure 12:
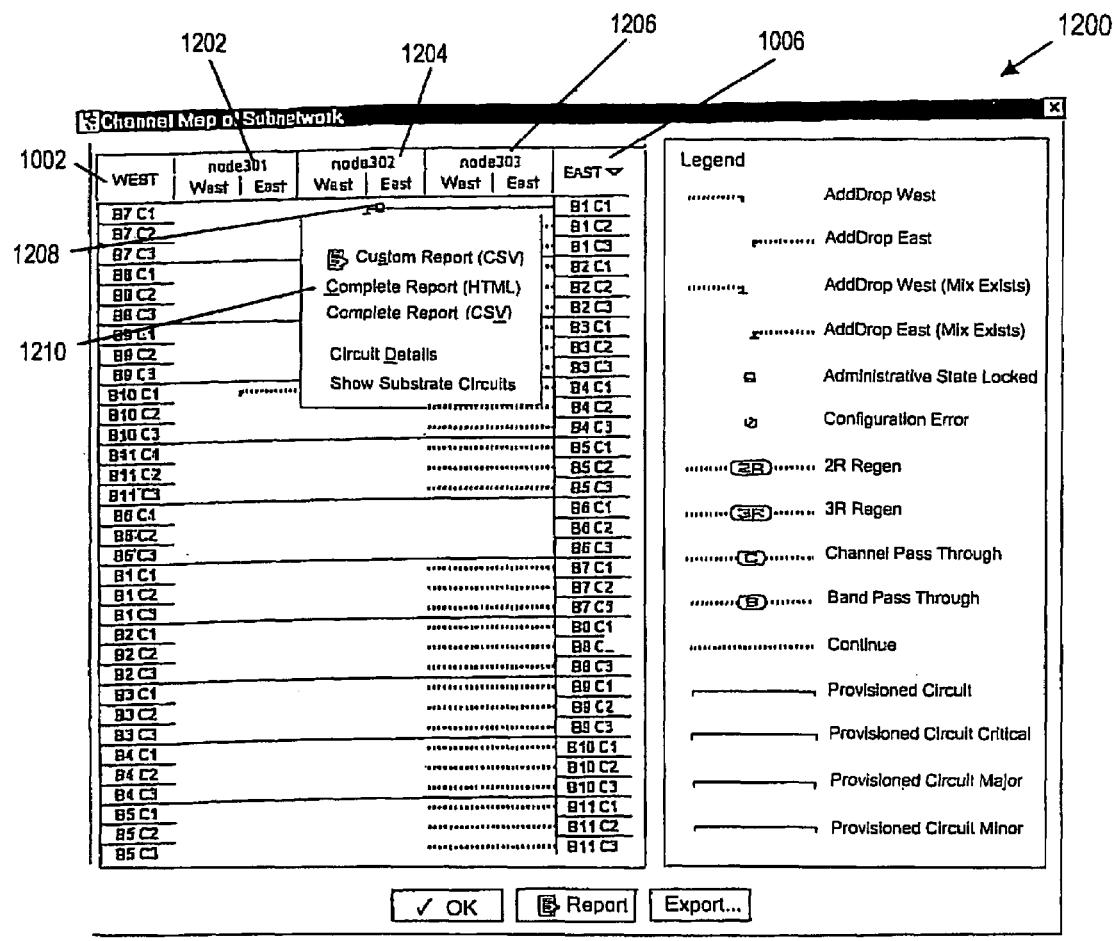
FIG. 12 illustrates a graphical representation of a second embodiment of the user interface for showing a channel map.

Referring now to FIG. 12, a second embodiment for the channel map user interface or display 1200 is shown. The second embodiment shows the channel and band assignment information for a plurality of nodes. Although the map shows only three nodes in FIG. 12, those skilled in the art will recognize that the user interface could be extended to include any number of nodes in the sub-network. The channel map display 1200 is similar to the first embodiment in terms of a legend, buttons, a west column 1002 an east column 1006. However, three columns 1202, 1204 and 1206 replace the single column 1004 of FIG. 10. The three columns 1202, 1204 and 1206 each have a similar display, organization and functionality of the signal column 1004. The columns 1202, 1204 and 1206 are positioned side-by-side similar to the connections between the nodes. The layout of the columns 1202, 1204 and 1206 in this manner is very advantageous because provisioned circuits can be readily seen. Similar to the single node interface 1000, the multiple node display 1200 includes functionality for showing additional information or generating reports. As shown in FIG. 12, a pop up menu 1210 of supported operations is generated over the channel map image in response to the user positioning the cursor over a circuit and right clicking. Detailed information about a circuit could be obtained from the circuit display in the channel map through a popup menu. If the circuits were bulk rate circuits (circuits which have subrate level circuits riding on them), then a list of provisioned subrate services riding on them could also be pulled up by clicking on the circuit in the channel map and invoking the "Show subrate circuits" operation.

Referring now to FIG. 13, the second embodiment of the user interface 1200 can also provide additional channel and circuit information in a window 1302. Again, the presentation of additional information is preferably done with the multi-line tool-tip that presents the channel information if the cursor is placed over the image of the icon representing the channel in any of the columns 1202, 1204 and 1206. The tool-tip shows information about the circuit including the critical alarm on the circuit. The circuit is colored red to indicate the critical alarm. Payload information, access type and the multiplexer type that is connected to the circuit pack are also shown. The absence of the lock denotes that the circuit is currently unlocked.

Referring now to FIGS. 14–16, exemplary interfaces for providing very particular channel data responsive to a command selected from pop up menus 1024, 1210 are shown. FIG. 14 illustrates a graphical representation of a display for showing circuit details. Selecting the "Circuit Details" operation from a pop up menu displays the dialog box of FIG. 14 that shows the complete details about the selected circuit including it's A and Z end point information. FIG. 15 illustrates a graphical representation of a display for showing subrate circuit details. Selecting the "Show Subrate Circuits" option displays the dialog box of FIG. 15 that lists all the subrate circuits that ride on the optical circuit. FIG. 16 is a graphical representation of a channel map HTML report generated by the system of the present invention. Clicking on the reports option generates the Channel Map Report. Those skilled in the art will recognize that an enhanced report having more detail could also be provided.

From the above description, it will be apparent that the invention disclosed herein provides a novel and advantageous system and method for displaying usage information about a network as a channel map. The foregoing discussion discloses and describes examples of methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for generating and displaying a channel map for a network, the method comprising the steps of:

retrieving channel data for a plurality of nodes in the network;

generating a graphical image of the channel map graphically illustrating at least one band and at least one channel of the at least one band and representing a first node and a second node of the plurality of nodes in the network from the retrieved channel data, the graphical image showing a relationship of a band and channel in the first node to a band and channel in the second node; and displaying the graphical image of the channel map, wherein the graphical image comprises labels for the bands and channels at each node, wherein the channel data include information regarding bands and channels utilized in the network, and wherein the network utilizes a plurality of bands and each band has a plurality of channels.

2. The method of claim 1, further comprising the step of determining nodes in the network, wherein the step of retrieving channel map data is performed for each node determined to be in the network.

3. The method of claim 1, further comprising the steps of:
receiving an input requesting information about a channel;
generating a second image of requested information; and
displaying the second image with the generated image.

4. The method of claim 3, wherein
the step of generating comprises creating a list of channel data, and
the step of displaying comprises creating a window over the graphical image of the channel map and showing the list in the window.

5. The method of claim 4, wherein the list of channel data also includes at least one of a side, circuit pack type, role and access type.

6. The method of claim 3, wherein the step of generating comprises producing a popup menu of supported operations including one from a group of get additional information, generate reports or transition to other channel map images.

7. The method of claim 1, further comprising the step of storing retrieved channel data for the plurality of nodes in storage at the element management system.

8. The method of claim 1, further comprising the steps of:
receiving an input requesting a report;
generating an image of the channel map in HTML format; and
opening a browser window and displaying the generated image in the window.

9. The method of claim 1, further comprising the steps of:
receiving an input requesting a report;
generating an image of the channel map in a printer file; and
sending the printer file to a printer.

10. The method of claim 1, further comprising the steps of:
receiving an input requesting an export of a channel map;
creating a file with the channel map data; and
storing the created file.

11. The method of claim 1, wherein the step of retrieving channel data comprises the steps of:
retrieving optical band channel assignments;
retrieving sub-rate information;
retrieving data on provisioned circuits; and
retrieving data on sub rate circuits.

12. The method of claim 1, further comprising the step of updating the channel map data and displaying an updated version of the channel map.

13. The method of claim 12, wherein the step of updating the channel map data and displaying an updated version of the channel map is responsive to one from the group of: user input, passage of time or an event being sent from an administrative complex of a node to the element management system.

14. The method of claim 1, wherein the graphical image of the channel map is a window having first, second and third columns, the first column provides labels for the bands and channels on a first direction to/from the first node, the third column provides labels for the bands and channels on a second direction to/from the second node, and the second column is positioned between the first and third columns and depicts channel and band allocation information.

15. The method of claim 14, wherein the second column has a plurality of cells with left and right portions for displaying west and east side information for the node and lines in the cells correspond to connections made by the node, and wherein rows in the first and third columns are labeled with a unique channel identifier that includes a row and channel designation.

16. The method of claim 15, wherein the rows are grouped in bands and each band is marked by visually distinct delineation.

17. The method of claim 15, wherein the graphical image of the channel map further comprises a legend positioned proximate the first, second and third columns in a split pane, the legend displays icons that may be placed in the cells of the second column and associated text descriptions.

18. The method of claim 15, wherein the icons in the legend include one from the group of:
icons indicating whether the node is performing an add/drop function and whether a multiplexer exists;
icons indicating administrative state;
icons representing alarm states;
icons representing regeneration or pass through by a node; and
icons representing error conditions.

19. The method of claim 15, wherein lines in the cells are used to represent circuits, and line with a first visual format represents a non-provisioned circuit, and a line with a second visual format represents a provisioned circuit.

20. The method of claim 19, wherein a color of a line used to indicate the status of the circuit, and wherein the line is colored a first color to indicate a critical problem, a second color to indicate a major problem, a third color to indicate a minor problem, and a fourth color to indicate no alarm conditions.

21. The method of claim 1, wherein the graphical image of the channel map is a window having a first column, a second column, and a plurality of additional columns, the first column providing labels for the bands and channels on a first direction to/from a node, the second column provides labels for the bands and channels on a second direction to/from a second node, and the plurality of additional columns is positioned between the first and second columns and depicts channel and band allocation information.

22. The method of claim 21, wherein each of the additional columns has a plurality of cells with left and right portions for displaying west and east side information for the node and lines in the cells correspond to connections made by the node, and wherein rows in the first and second columns are labeled with a unique channel identifier that includes a row and channel designation.

23. The method of claim 1, wherein at least one channel of the plurality of channels is an optical signaling channel carrying administrative information.

24. The method of claim 23, wherein the optical signaling channel is carried on a wavelength channel out-of-band from payload wavelength channels.

25. The method of claim 23, wherein the optical signaling channel occupies one or more divisions of a time-division multiplexed signal.

26. The method of claim 23, wherein the optical signaling channel is modulated onto payload signals.

* * * * *